United States Patent
Graves et al.

(10) Patent No.: US 6,999,677 B2
(45) Date of Patent: Feb. 14, 2006

(54) PROTECTION SWITCHING ARRANGEMENT FOR AN OPTICAL SWITCHING SYSTEM

(75) Inventors: Alan F. Graves, Kanata (CA); Dallas F. Smith, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 752 days.

(21) Appl. No.: 09/726,027

(22) Filed: Nov. 30, 2000

(65) Prior Publication Data

US 2002/0064336 A1     May 30, 2002

(51) Int. Cl.
*H04B 10/00* (2006.01)

(52) U.S. Cl. .................. 398/5; 398/7; 398/12; 398/14; 398/17; 398/19; 398/33; 398/1; 398/3; 398/45; 398/48; 398/50; 398/56; 398/79; 398/82; 398/83; 398/53; 398/175; 398/176; 385/24; 385/37; 385/16; 385/17; 385/18

(58) Field of Classification Search .................... 398/9, 398/10, 12, 17, 19, 33, 45, 50, 1, 5, 7, 14, 398/56, 3, 79, 82, 83, 53, 175, 176, 48; 385/24; 385/37, 16, 17, 18

See application file for complete search history.

(56) References Cited

U.S. PATENT DOCUMENTS

| | | | | |
|---|---|---|---|---|
| 5,457,556 A | * | 10/1995 | Shiragaki | 398/50 |
| 6,317,529 B1 | * | 11/2001 | Kashima | 385/16 |
| 6,433,900 B1 | * | 8/2002 | Kuroyanagi et al. | 398/19 |
| 6,498,792 B1 | * | 12/2002 | Johnson et al. | 370/388 |
| 6,570,685 B1 | * | 5/2003 | Fujita et al. | 398/79 |
| 6,579,018 B1 | * | 6/2003 | Li et al. | 398/4 |

* cited by examiner

Primary Examiner—Hanh Phan

(57) ABSTRACT

A protection arrangement for an optical switching system includes protection switching for switch planes in the optical core and for ports in the tributary cards. For a multiple layer switch core protection is also provided between layers. A first layer is for switching optical channels. The protection switches used may be 1×N, 2×N or 3×N MEMS optical switches. The 1×N MEMS provides for protection switching. The 2×N MEMS provides protection switching and testing capability. The 3×N MEMS provides for protection switching, testing and backup of the protection switching. Application of these protection switches is shown in lambda plane switch cores, multiple layer switch cores and combined switch cores.

18 Claims, 14 Drawing Sheets

PROTECTION SWITCHING ARRANGEMENT FOR AN OPTICAL SWITCHING SYSTEM

CROSS-REFERENCE TO RELATED APPLICATIONS

The present application is related in subject matter to co-pending U.S. application Ser. No. 09/511,065, entitled "Switch For Optical Signals", filed on Feb. 23, 2000, assigned to the Assignee of the present invention and hereby incorporated by reference herein in its entirety. The present application is also related in subject matter to co-pending U.S. application Ser. No. 09/593,697 entitled "Optical Switching Device", filed on Jun. 15, 2000, assigned to the Assignee of the present invention and hereby incorporated by reference herein in its entirety. The present application is also related in subject matter to co-pending U.S. application Ser. No. 09/703,631 entitled "Optical Switching System for Switching Optical Signals in Wavelength Groups", filed on Nov. 2, 2000, assigned to the Assignee of the present invention and hereby incorporated by reference herein in its entirety. The present application is also related in subject matter to co-pending U.S. application Ser. No. 09/648,767 entitled "Method, System and Signal for Carrying Overhead Information in a Transport Network Employing Optical Switching Nodes", filed on Aug. 28, 2000, assigned to the Assignee of the present invention and hereby incorporated by reference herein in its entirety.

The present application is also related in subject matter to co-pending U.S. application Ser. No. 09/580,495 entitled "Optical Switch with Power Equalization", filed on May 30, 2000, assigned to the Assignee of the present invention and hereby incorporated by reference herein in its entirety.

FIELD OF THE INVENTION

The present invention relates generally to systems for switching optical signals and more particularly to protection switching arrangements for such systems.

BACKGROUND OF THE INVENTION

Dense Wavelength Division Multiplexing (DWDM) of optical signals is a technique used to carry many optical signals on a single optical fiber. In DWDM systems, the transmission spectrum, for example 1520 nm to 1550 nm, is divided into many channel wavelengths with adequate spacing left between each channel wavelength to allow for separation of the DWDM signal into its constituent channel wavelengths, also referred to as lambdas, in a demultiplexer, feeding an array of receivers. Each optical signal in the DWDM signal has a unique wavelength representing a particular frequency, which has been assigned to the carrier signal of that channel, the carrier signal having been modulated at a high bit-rate, for example 10 Gb/s, by data to be transmitted on that channel wavelength. This creates optical sidebands above and below the carrier frequency. These determine the densest practical spacing in a WDM system since they must not overlap. As improvements in DWDM related techniques are made, for example improvements in modulation of carrier signals and demultiplexing of DWDM signals into their constituent optical signals, it is feasible that more optical signals, each of a higher bit-rate, will be carried on a single fiber. For example, systems are currently envisioned that will transmit up to 160 channel wavelengths, each carrying up to 10 Gb/s of data, on a single fiber. As these advances are made, switches for switching the DWDM signals will be required to switch a larger number of optical signals both with a granularity of an individual wavelength and as groups of wavelengths, resulting in larger and more complex switch architectures.

With any optical switching system there is a concern of data loss due to a breakdown of the physical path through the optical switching system. The use of DWDM techniques amplifies this concern due to the increased number of channels involved in any physical path breakdown.

In view of the above, there is a need for a protection switching arrangement for optical switching system that addresses the protection requirements of optical switching systems using DWDM techniques described above.

SUMMARY OF THE INVENTION

It is an object of the present invention to provide an improved protection switching arrangement for optical switching systems.

Accordingly, the protection switching arrangement for the optical switching system provides a way to protect the dense traffic in DWDM and WDM optical signals by providing alternative switching paths. Conveniently optical wavelengths may be referred to as lambdas and groups of optical wavelengths as lambda groups.

According to an aspect of the present invention there is provided a protection switching arrangement for optical switching systems comprising: a plurality of optical switching matrices having multiple inputs and multiple outputs and being operable to optical channel signals from any one of a plurality of the inputs to any one of a plurality of the outputs; a plurality of wavelength division demultiplexers coupled at its outputs to the inputs of the plurality of optical switching matrices for dividing a composite optical signal into optical channel signals and providing each optical channel signal to a corresponding optical switching matrix; a spare wavelength division demultiplexer coupled at its outputs to the inputs of the plurality of optical switching matrices for dividing a composite optical signal into optical channel signals; and at least one optical protection switch having a plurality of inputs and a plurality of straight-through outputs and at least one protection output and coupled at each of its straight-through outputs to an input of a respective one of the plurality of wavelength division demultiplexers and coupled at its protection output the inputs of the spare wavelength division demultiplexer.

An advantage of embodiments of the invention is the provision of in situ testing during various phases of implementing and recovering from a protection switch condition for the 2×N and 3×N protection switches.

In accordance with another aspect of the present invention there is provided a protection switching arrangement comprising: a first logical layer for switching optical channels; a second logical layer for switching a group of optical channels; and a first coupler for grouping together optical channels of the first logical layer and coupling them to the second logical layer; a second coupler for ungrouping grouped optical channels of the second logical layer and coupling them to the first logical layer; a first protection switch providing an alternative switch path for at least one of the grouped optical channels from the first logical layer in the second logical layer.

In accordance with another aspect of the present invention there is provided a protection switching arrangement for optical switching systems comprising an optical protection switch including: a first column of deployable mirrors, each mirror operable for deflecting an optical signal from an optical signal input path to a protection path; and a second column of deployable mirrors, each mirror operable for deflecting an optical test signal from an optical test signal input path to an optical switch testing path wherein for each mirror of the first column and corresponding mirror of the second column, the respective optical signal input path and optical switch test path are substantially aligned.

In accordance with another aspect of the present invention there is provided protection switching arrangement for optical switching systems comprising an optical protection switch including: a first column of deployable mirrors, each mirror operable for deflecting an optical signal from an optical signal input path to a protection path; a second column of deployable mirrors, each mirror operable for deflecting an optical test signal from an optical test signal input path to an optical switch testing path; and a third column of deployable mirrors, each mirror operable for deflecting an optical signal from an optical signal input path to a protection path; wherein for each mirror of the first and third column and corresponding mirror of the second column, the respective optical signal input path and optical switch test path are substantially aligned.

Other aspects of the invention include combinations and sub combinations of the features described above other than the combinations described above.

BRIEF DESCRIPTION OF THE DRAWINGS

The invention will be further understood from the following detailed description of embodiments of the invention with reference to the drawings, in which.

DETAILED DESCRIPTION

Figure 1:
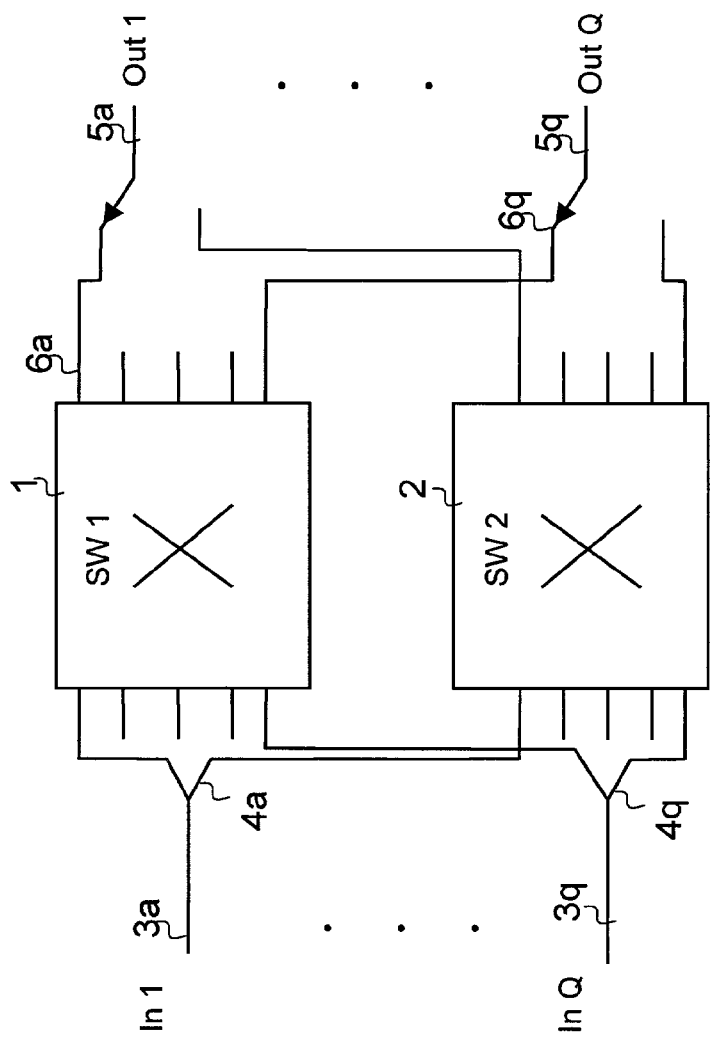
FIG. 1 illustrates in a functional block diagram a known optical switch protection arrangement.

Referring to FIG. 1 there is illustrated in a block diagram a known optical switch protection arrangement. The known protection arrangement provides a first switch core 1 and a second switch core 2. A plurality of inputs 3a–3q are connected to both switch cores via 3 dB splitters 4a–4q. A plurality of outputs 5a–5q are connected to one of switch cores 1 and 2 via an array of switches 6a–6q. For simplicity, none of the control circuitry required is illustrated with only the optical paths being shown.

In operation, one switch core is active, for example switch core 1, while the other is inactive or on standby, in the present example switch core 2. Upon detection of a fault in switch core 1, the array of switches 6a–6q are activated to switch to the standby core switch 2. As can be appreciated, there are concerns associated with this arrangement. The arrangement requires duplication of the core switch, thereby doubling the cost of the switch core. The arrangement requires switching every output, which for large cores may involve hundreds of connections, thereby causes transient losses of data for all connects in the switch. The splitters introduce an additional 3 dB loss per line that must be compensated. However, the use of the 3 dB splitter permits traffic to be fed into both switch fabrics SW1 and SW2, thereby facilitating routine testing of the protection fabric, e.g. SW1, to insure that it has not failed. However, it does not permit the injection of any optical test signals.

Figure 2:
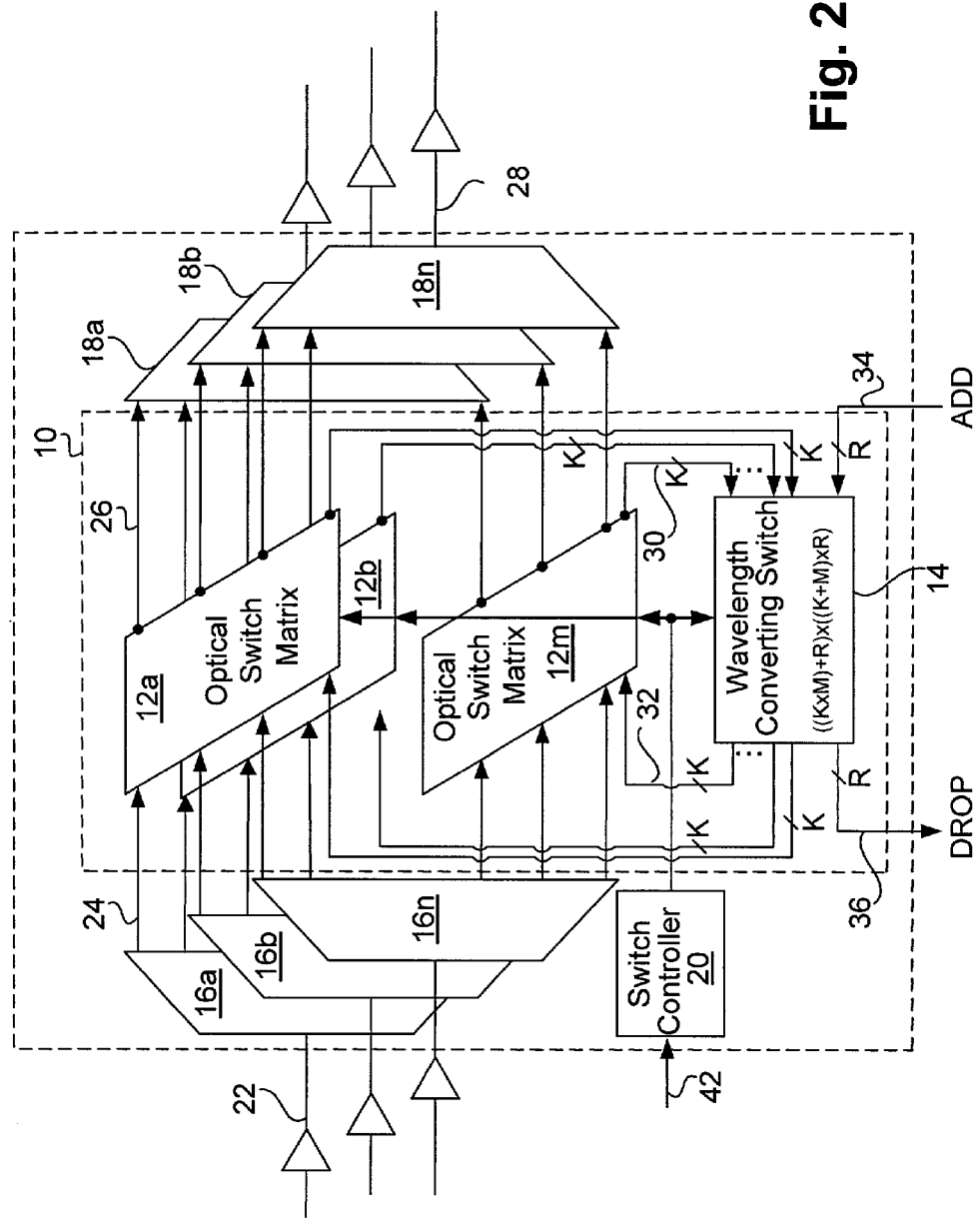
FIG. 2 illustrates in a functional block diagram a lambda-plane switch of a co-pending application of the present applicant.

Referring to FIG. 2 there is illustrated in a functional block diagram a WDM optical switching system 10 of a co-pending application of the present applicant. The system 10 switches the individual optical carriers or groups of carriers of throughput Dense WDM (DWDM) optical signals, each signal consisting of M optical signal channels. Each of the M channels carries an optical signal modulated on an optical carrier of a wavelength unique to that channel. Incoming DWDM optical signals are split, or demultiplexer, into their component optical signal channels, which are then, switched by the system 10, and then combined, or multiplexed, into outgoing DWDM optical signals. The system 10 has N input ports and N output ports to receive and transmit the incoming and outgoing DWDM optical signals, respectively.

The system 10 includes a wavelength-plane optical switching sub-system 12, a plurality N of 1 to M demultiplexers 16, a plurality N of M to 1 multiplexers 18, a wavelength converting switch 14 and a controller 20. After input preamplifier 21, a plurality N of fibers 22 are coupled to the plurality N of demultiplexers 16 at the ingress of the system 10, each fiber 22 coupled to a respective demultiplexer 16. Each of the demultiplexers 16 has one input and M outputs. For the purpose of example M=40 and N=24. A plurality N of array of optical interconnections 24, each of width M couple the N×M outputs of the demultiplexers 16 to M×N port inputs (Pi) of the optical switching sub-system 12. Similarly, a plurality N of array of optical interconnections 26, each of width M, couple N×M port outputs (Po) of the optical switching sub-system 12 to N×M inputs of the multiplexers 18. Each of the N multiplexers 18 has M inputs and one output. A plurality N of fibers 28 are coupled to the plurality of multiplexers 18 at the egress of the system 10, each fiber 28 coupled to a respective multiplexer 18 and an output preamplifier 29. The switching sub-system 12 is a wavelength plane structure in that it includes a distinct switching matrix, or matrices, for switching each one of the M unique wavelengths or wavelength groups.

The optical switching sub-system 12 includes a plurality K of matrix output ports (Mo) and a plurality K of matrix input ports (Mi) for coupling optical signal channels to the wavelength converting switch 14. A plurality M of optical interconnection arrays 30, each of width K, couple K×M matrix output ports (Mo) to the wavelength converting switch 14 at its ingress. Similarly, the egress of the wavelength converting switch 14 is coupled to K×M matrix input ports (Mi) via a plurality M of optical buses 32, each of width K. The wavelength converting switch 14 has a plurality R of inputs for adding optical signal channels 34 and a plurality R of outputs for dropping optical signal channels 36.

Figure 3:
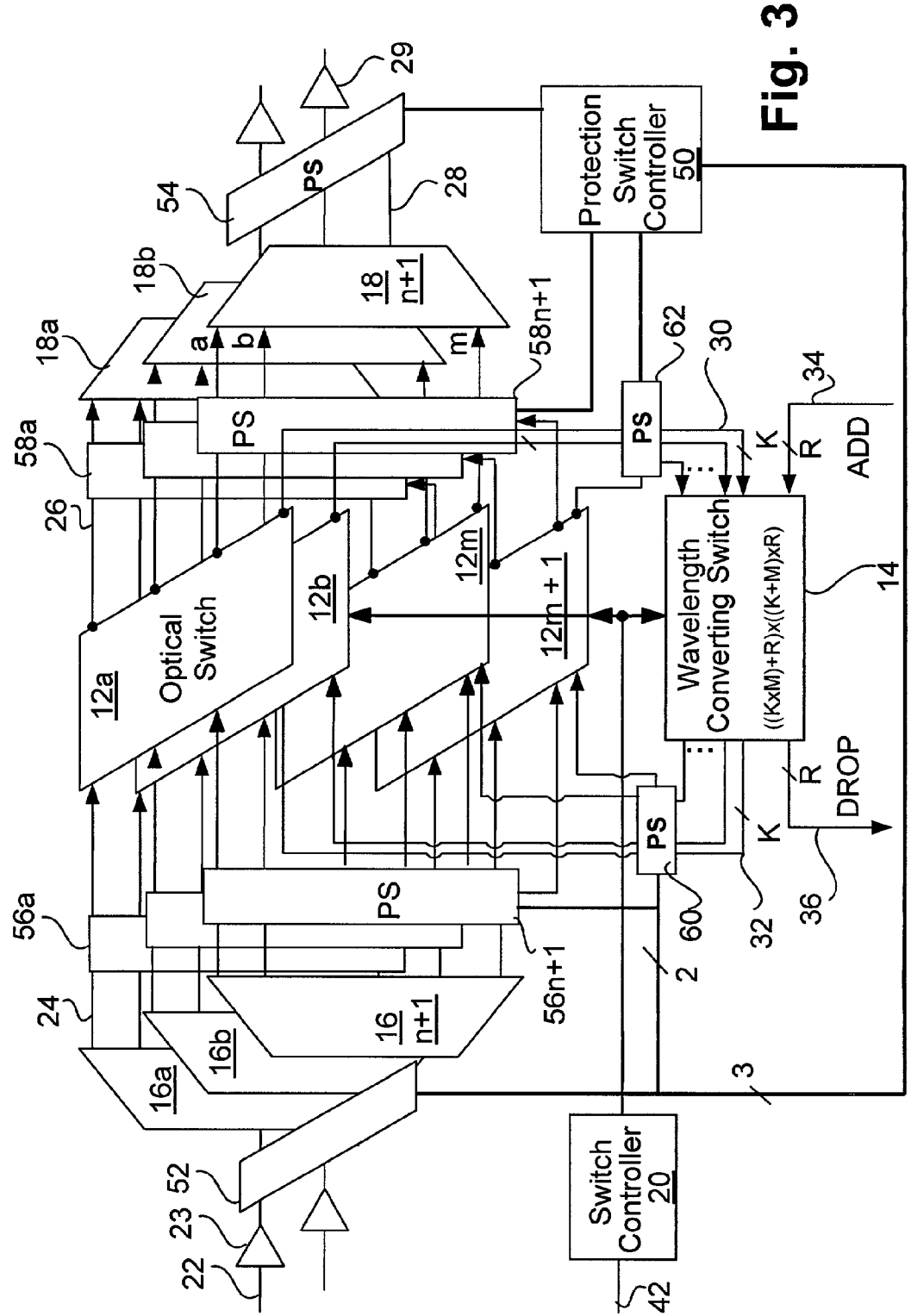
FIG. 3 illustrates in a functional block diagram lambda-plane optical switch of FIG. 2 with a protection switching arrangement in accordance with an embodiment of the present invention.

Referring to FIG. 3 there is illustrated in a functional block diagram a WDM optical switching system 10 of FIG. 2 including a protection switching arrangement in accordance with a first embodiment of the present invention. To protect a photonic switch having N inputs and M planes requires the addition of an WDM demux 16$n$+1, a protection switch 56$n$+1, an additional switch plane 12$m$+1 together with additional input and output on all switch planes (N×N) such that they become (N+1)×(N+1) switch planes, a WDM mux 18$n$+1, a protection switch 58$n$+1, and input and output 1×N protection switches 52 and 54. A protection switch controller 50 activates the protection switches in response to measurements indicative of fault conditions.

In operation, the protection switch controller 50, responsive to conditions in the switch indicative of a fault condition, actives the appropriate protection switches. For example, a fault in one of the port cards carrying for demux 16$b$ and mux 18$b$ would cause the protection switch controller 50 to activate the protection switch 52 to switch the entire incoming DWDM signal to the spare demux 16$n$+1, at the same time the protection switch 54 would switch from the corresponding mux 18$b$ to the spare mux 18 n+1 to complete the protection switch. A fault in the switch core, for example optical switch matrix 12$b$ would cause activation of all protection switches 56 and 58 to switch the traffic from 12$b$ representing the entire switch traffic at that lambda to the spare switch matrix 12$m$+1. Further detail of the operation of this protection switching arrangement is described with regard to FIG. 8.

Figure 4:
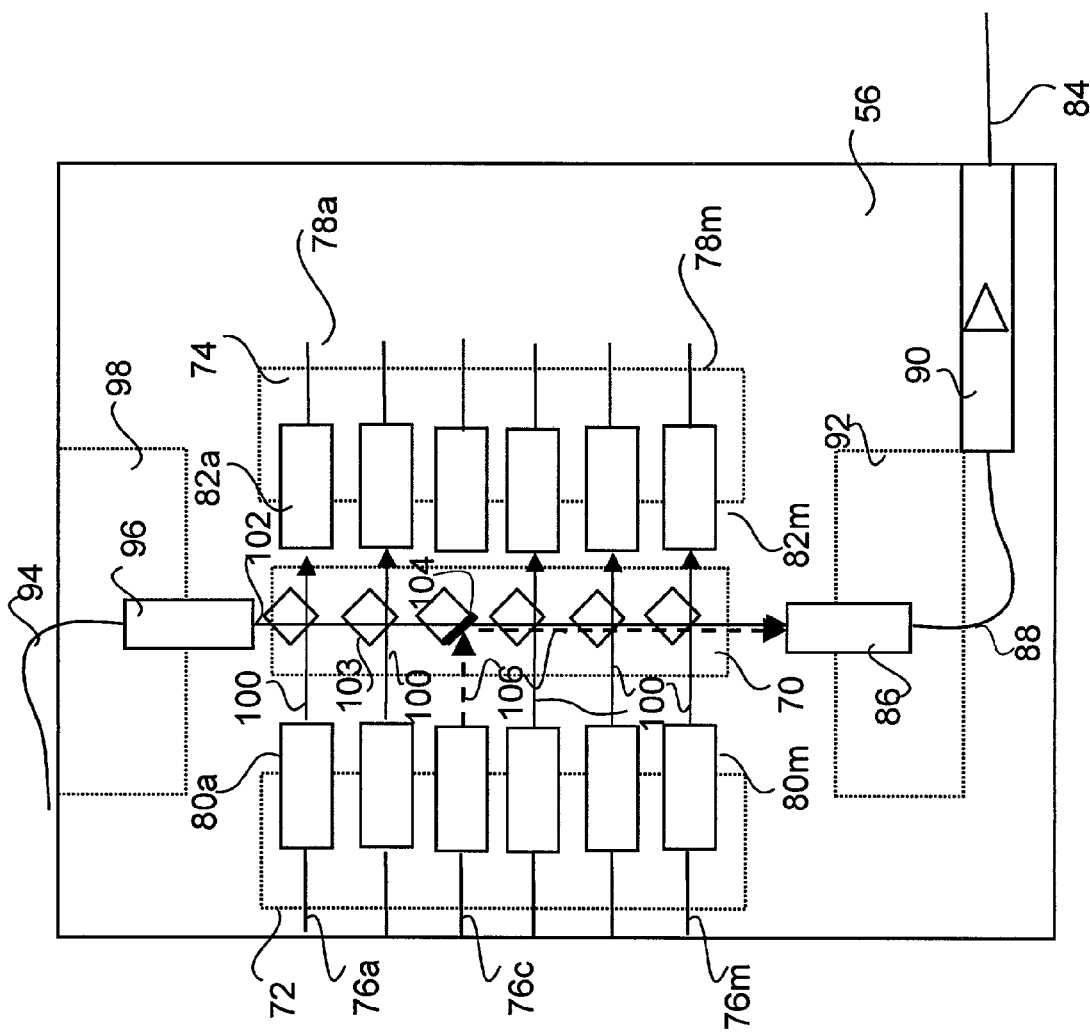
FIG. 4 illustrates a protection switch in accordance with an embodiment of the present invention.

Referring to FIG. 4 there is illustrated a protection switch in accordance with an embodiment of the present invention. The protection switch 56 includes a four-port 1×M MEMS optical switch 70 having a linear array of erectable mirrors fabricated by known techniques (see Lih Y. Lin who describes such a device in the form of a Micro-Electro-Mechanical System (MEMs) in an article entitled "Free-Space Micromachined Optical-Switching Technologies and Architectures" in OFC99 Session W14-1 Proceedings published Feb. 24, 1999). Substrates 72 and 74 are provided with V-grooves for aligning input fibers 76$a$–$m$ and output fibers 78$a$–$m$ with rod lenses 80$a$–$m$ and 82$a$–$m$, respectively. A protection output fiber 84 is coupled to the 1×M MEMS optical switch 70, via a rod lens 86, a fiber 88 and an optical amplifier 90. The rod lens 86 and the fiber 88 are aligned on substrate 92. A test channel is provided via a test fiber 94 and rod lens 96 aligned on substrate 98 such that they are aligned with the rod lens 86 and the fiber 88. The rod lenses 80$a$–80$m$ and the rod lenses 82$a$–82$m$ are aligned such that, when a MEMS mirror (e.g. mirror 103) is not erect, the light from the respective fiber 76$a$–76$m$, having been collimated through rod lenses 80$a$–80$m$ and projected across the intervening gap, is refocused by rod lenses 82$a$–82$m$ such that it is coupled into fibers 78$a$–78$m$. A similar situation exists for the fiber 94, rod lenses 96 and 86 and the fiber 88. The MEMS mirrors are positioned to deflect one of the collimated light beams from 80$a$–80$m$ into the rod lens 86 so that the light center in the appropriate lens in the set 80$a$–80$m$ from its associated fiber is coupled by lens 86 into the fiber 88, thereby completing a switched optical path.

In operation, when no fault is detected, optical signals pass from the input to the output, for example from input 76$a$ to output 78$a$ as indicated by an arrow 100. Since the optical path is very short, this path can be designed with have a very low optical loss. Also, a test signal may be input across the 1×M MEMS optical switch 70 via the test fiber 94 and the rod lens 96, passing over the M inactivated mirrors of the MEMS and reaching the rod lens 86 as shown by an arrow 102, thereby allowing periodic testing of the protection path.

When a fault is detected the appropriate mirror, for example a mirror 104, is deployed and an optical signal input via the fiber 76$c$ is deflected as shown by a broken-line arrow 106 to the protection path. This protection path is longer, hence introduces higher optical loss (typically for a 20:1 switch the loss would be 3 dB compared to 1 dB for the unprotected path). Consequently the optical amplifier 90 (EDWA, Erbium doped waveguide amplifier) is introduced in the protection path to compensate for the loss. A single amplifier can compensate for the loss in protection switches on both sides of the protected entity, since the concatenated extra loss of these switches (typically about 4 dB) is well within the gain of a low performance EDWA.

Figure 5:
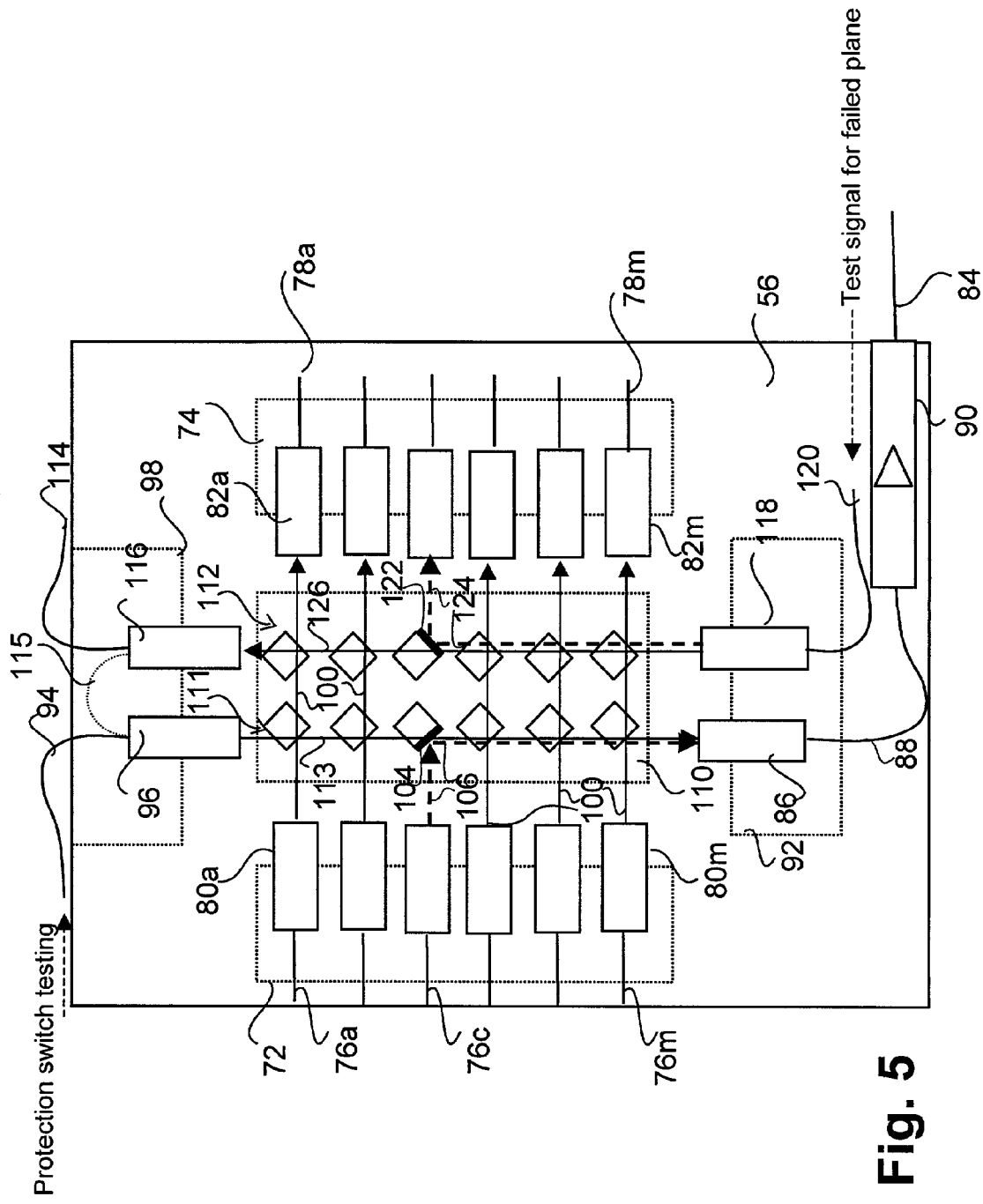
FIG. 5 illustrates a protection switch in accordance with a further embodiment of the present invention.

Referring to FIG. 5 there is illustrated a protection switch in accordance with a further embodiment of the present invention. The protection switch of FIG. 5 is similar to that of FIG. 4, except that the 1×M MEMS 70 is replaced by 2×M MEMS 110, having a first column of mirrors 111 oriented such that they couple light to/from ports 76$a$–76$m$ and a second column of mirrors 112 oriented in a different plane to the mirrors of 111 such that they couple light to/from the second set of ports 78$a$–$m$. The second column of mirrors 112 is aligned with a fiber 114 and a rod lens 116 and a rod lens 118 and a fiber 120 forming a test channel. In the normal unprotected state, the traffic optical paths flow straight across this port as indicated by arrow 100, as similarly shown in FIG. 4. As shown in FIG. 4, in a protection switch state when a mirror 104 is deployed in the first column of mirrors 111, a corresponding mirror 122 in the second column of mirrors 112 may be deployed to allow a test signal, input via the fiber 120 to be injected to the output 78$c$ for testing the faulty component, as indicated by the line-broken arrow 124. Normally, when protection switching is not required, a test signal, as indicated by an arrow 113, may be passed over the first mirror column 111, from rod lens 96 and another test signal as indicated by arrow 126 may be passed over the second mirror column 112, from rod lens 96 for test purposes, in a similar way to the test signal indicated by the arrow 102 was used in FIG. 4. Alternatively, by providing hairpin connection between fiber 94 and fiber 114 as indicated by broken line half circle 115, an optical test signal injected at the fiber 120 can be used both for testing a failed switch plane, in protection mode and for testing the protection switch 110 in normal mode.

Figure 6:
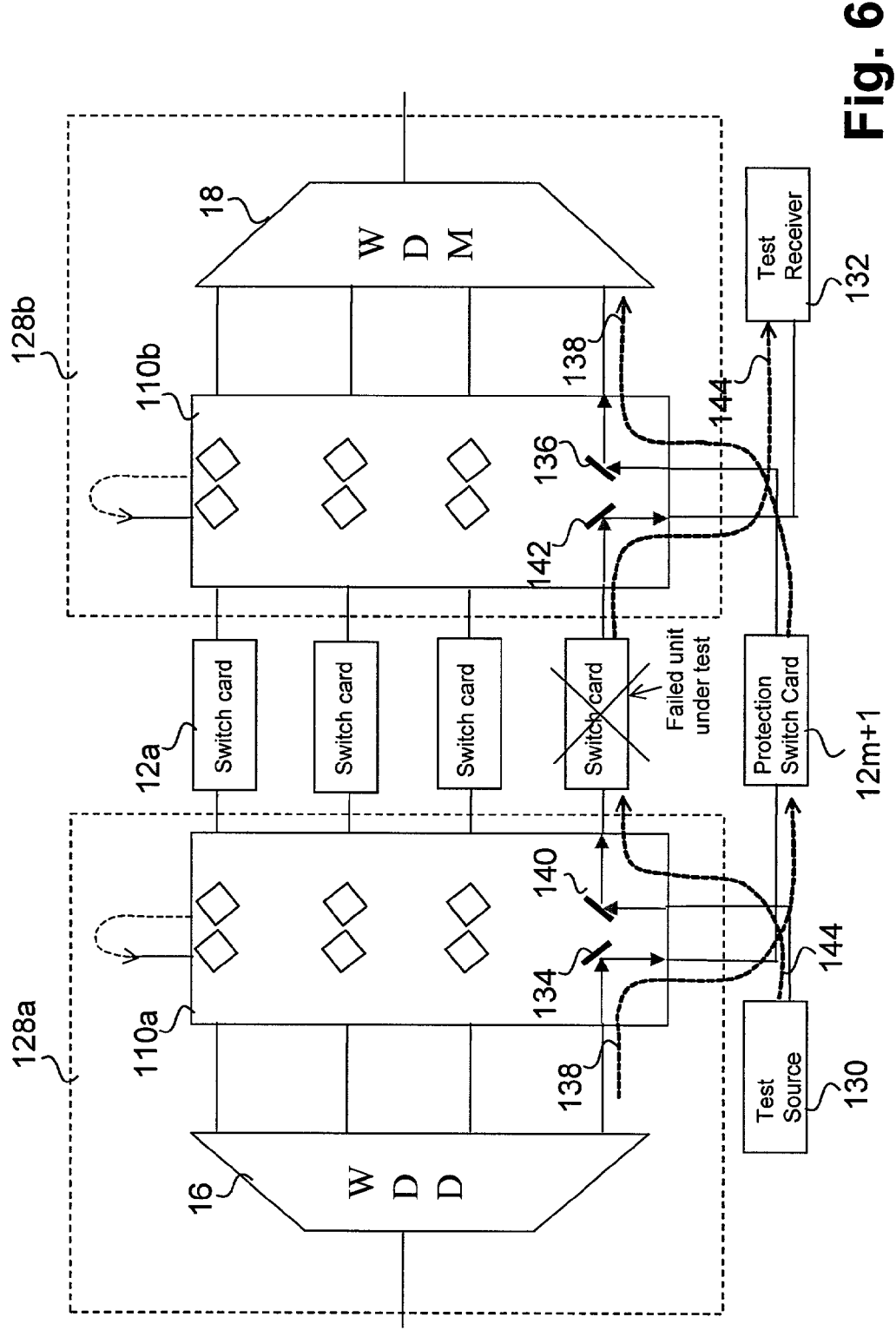
FIG. 6 illustrates a protection switching arrangement using the protection switch of FIG. 5.

Referring to FIG. 6 there is illustrated a protection switching arrangement using the protection switch of FIG. 5. In this figure the active mirrors are shown as diagonal lines while the diamonds represent mirrors that are not active. The protection switching arrangement involves tributary cards 128a and 128b, switch cards 12a to 12m, protection switch card 12m+1, a test source 130 and a test receiver 132. By way of example a switch plane 12m has failed in some way. Mirrors 134 and 136 of 2×M MEMS 110a and 110b, respectively, are deployed to establish a protection path 138 through the protection switch card 12m+1. At the same time a corresponding mirrors 140 and 142 of 2×M MEMS 110a and 110b, respectively, are deployed to establish a test path 144 between the test source 130 and the test receiver 132 and through the faulty switch plane for the purpose of exercising the switch plane to determine the nature of the failure. Note, if the protection path is now removed from service and traffic is returned to the normal (unprotected) state, the test generator in automatically connected to the protection card to continuously verify its availability.

Figure 7:
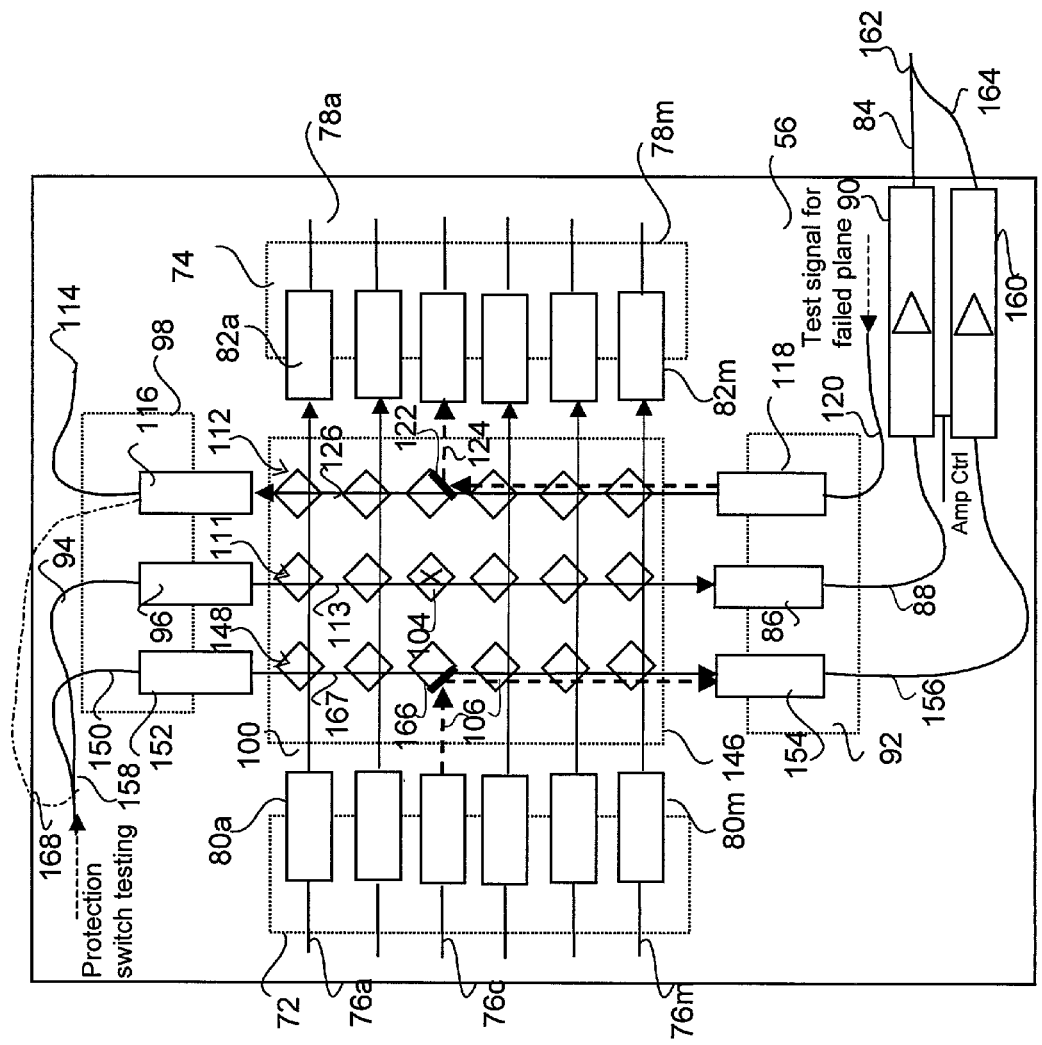
FIG. 7 illustrates a protection switch in accordance with another embodiment of the present invention.

Referring to FIG. 7 there is illustrated a protection switch in accordance with another embodiment of the present invention. The protection switch of FIG. 7 is similar to that of FIG. 5, except that the 2×M MEMS is replaced by a 3×M MEMS 146, having an third column of mirrors 148, aligned with a fiber 150 and a rod lens 152 and a rod lens 154 and a fiber 156. A splitter 158 is connected to both fibers 94 and 150, an optical amplifier 160 is connected to the fiber 156 and a combiner 162 connects fibers 88 and a fiber 164 from the optical amplifier 160.

In operation, FIG. 7, when a mirror 104 fails to deploy in the protection switch condition, a mirror 166 in the third column of mirrors 152 is deployed to allow a optical signal from input fiber 76c, to be diverted to the protection path via the rod lens 154 and the fiber 156. The optical amplifier 160 is activated when the primary protection switch mirrors are determined to be inoperative. The secondary protection switch mirrors, third column 148 are placed in front of the primary protection switch mirrors, first column 111, so that failures can be bypassed by deploying mirrors in the third column of mirrors 148. Downtime would still be required to replace the failed protection switch, however the auxiliary row of mirrors would allow restoration of service between the time of failure and the repair period.

As shown in FIG. 7, in a protection switch state when a mirror 166 is deployed in the third column of mirrors 148, a corresponding mirror 122 in the second column of mirrors 112 may be deployed to allow a test signal, input via the fiber 120 to be injected to the output 78c for testing the faulty component, as indicated by the line-broken arrow 124.

Normally, when protection switching is not required, a test signal, as indicated by arrows 113 and 167, may be passed over the first and third mirror columns 111 and 148, respectively, for test purposes, in a similar way to the test signal indicated by the arrow 113 was used in FIG. 5. Alternatively, by providing hairpin connection between splitter 158 and fiber 114 as indicated by broken line 168, an optical test signal injected at the fiber 120 can be used both for testing a failed switch plane, in protection mode and for testing the protection switch 146 in normal mode.

Figure 8:
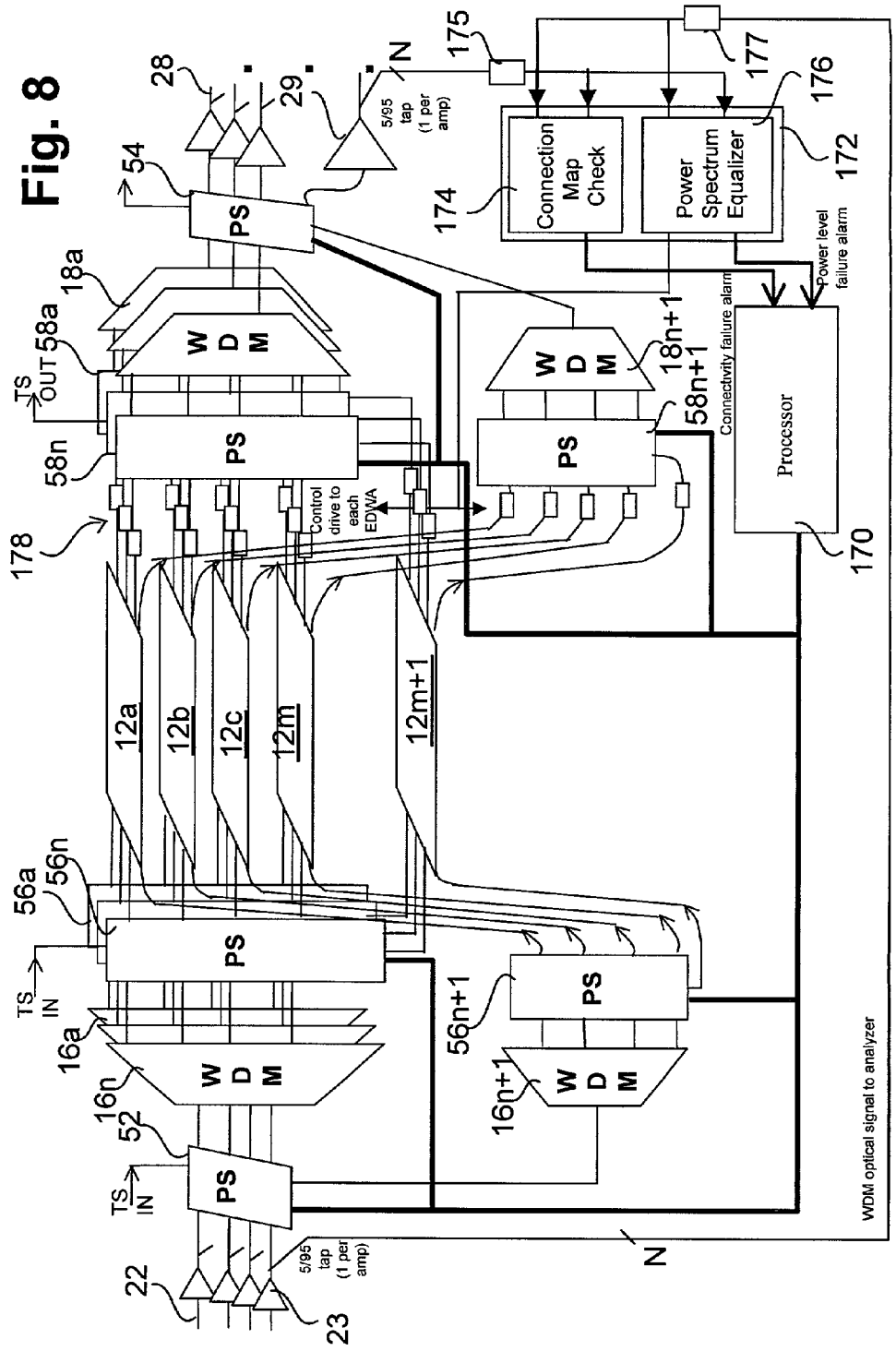
FIG. 8 illustrates further detail of the lambda-plane optical switch with a protection switching arrangement of FIG. 3.

FIG. 8 illustrates further detail of the lambda-plane optical switch with a protection switching arrangement of FIG. 3. FIG. 8 includes detail on the control circuitry for monitoring of the photonic switch and for activating the protection switches. To protect a photonic switch having N inputs and M planes requires the addition of an WDM demux 16n+1, a protection switch 56n+1, an additional switch plane 12m+1 together with additional input and output on all switch planes (N×N) such that they become (N+1)×(N+1) switch planes, a WDM mux 18n+1, a protection switch 58n+1, and input and output 1×N protection switches 52 and 54. Alternatively, if full N×N switching were not required [(N−1)+1]×[(N−1) +1] could be provided without increasing the dimensions of the switch matrices.

The simplified protection switch controller 50 of FIG. 3 is replaced by a maintenance and protection processor 170 and a switch verification/equalization block 172 having a connection map check function 174 and a power spectrum equalization function 176. The processor 170 is connected to each of the protection switches (just as controller 50 was in FIG. 3) and receives input from the connection map check function 174 and the power spectrum equalization function 176. Both the connection map check function 174 and the power spectrum equalization function 176 are fed from selective front ends 175 and 177 connected to a tap on the input and output amplifiers 23 and 29 of respective input and output fibers connected to the switches. This selective front end cycles round all of the inputs and outputs in any one of various methods (further detail provided in above referenced co-pending application) to allow each wavelength of each fiber in and out to be connected to the analysis block for some or all of the time depending upon the design of the selective front end. The connection map check function 174 and the power spectrum equalization function 176 are the subject matter of related co-pending patent applications, hence details of these functions are not duplicated here. The maintenance and protection processor 170 takes the connection status input and the power spectrum measurement input and determines therefrom when a failure condition exists in the optical switch and where that failure is located.

A small percentage of both the input and output signals are tapped (typically 5%) and these is fed into the switch verification/equalization block 172. Within the connection map function 174, the connection map actually being implemented by the switch (as opposed to the connection map being sent from the control processor to the switch) is determined by a process of comparing outputs with inputs. At the same time the output signal parameters, especially that of output power is determined by the power spectrum equalization function 176 (and used to flatten the output spectrum by adjusting the gain on the per lambda EDWAs). Both the path check and signal integrity check are implemented on a per lambda basis. The results from switch verification/equalization block 172 functions connection map check function 174 and the power spectrum equalization function 176 are fed to the maintenance and protection processor 170 where they are analyzed. An output signal may be out-of-range in amplitude (i.e. cannot be compensated for by changing the EDWA gain ) because of several reasons such as equipment failure within the switch (e.g. high loss in crosspoint) or due to loss-of-input/low input. The failures in the switch have to be differentiated from failures of incoming signals and this is done in the maintenance processor 170, by, in this case, examining both the input power to the switch node and the output power to determine whether the switch loss/gain is within specification. Similarly, connection mismatches are analyzed as described in further detail in another above-referenced co-pending application. In the event that the maintenance and protection processor 170 determines that a switch plane has failed, it tests the spare protection path, then, if good, switches the spare protecting plane in place of the switch card that is suspected to have failed. Once this is done, the switch card that is now out-of-service can be tested by using the second row of mirrors to inject test signals to localize the failure. In the event that the maintenance and protection processor 170 determines that it is likely that a port card has failed that can also be removed from service, then tested. Clearly, it is important that the analysis/assessment of the maintenance and protection processor 170 as to which unit has failed is as accurate as possible before it triggers a protection switch, since the protection switch operation causes a service-affecting transient during the switching operation.

Figure 9:
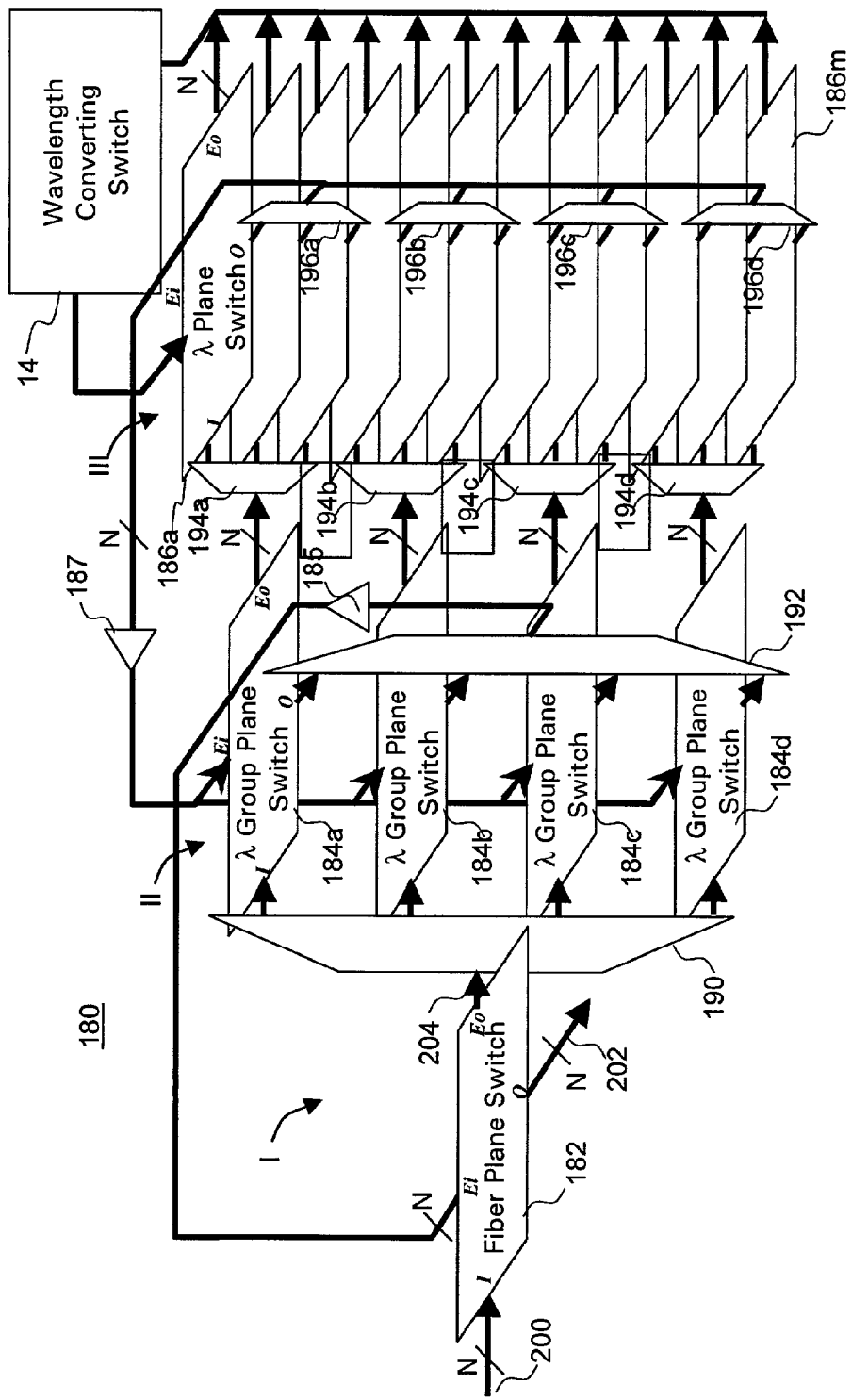
FIG. 9 illustrates a multiple-granularity multiple-plane optical switch core of a co-pending application of the present applicant.

Referring to FIG. 9 there is illustrated a multiple-granularity multiple plane optical switch core of a co-pending application of the present applicant. Briefly, the optical switch core 180 includes a fiber plane optical switch 182, a plurality J of lambda group plane optical switches 184, each associated with a plurality L of lambda plane optical switches 186, where J×L=M, resulting in a total of M lambda plane switches. In FIG. 9, for example, J=4, L=3, hence M=12. Each plane switch is implemented in 4-port MEMS having input ports I and output ports O and expansion input ports Ei and expansion output ports Eo. The plane switches can also be implemented as six-port MEMS as described in detail in the above-referenced co-pending application. Six-port MEMS will be discussed in further detail with regard to FIG. 12. Also included are a plurality N of 1 to J lambda band demultiplexers or de-interleavers 190, a plurality N of J to 1 lambda band multiplexers or interleavers 192. J pluralities of N 1 to L per lambda channelized demultiplexers are represented by 194a through 194d and J pluralities of N L to 1 per lambda channelized multiplexers are represented by 196a through 196d. For simplicity a controller for setting up switched paths through individual optical switches 182, 184, and 186 is not shown in FIG. 9. An array of low cost, low gain optical amplifiers 185 between the lambda group switch and the fiber switch and another array of similar optical amplifiers 187 between the lambda switches 16 and lambda group switches 184 are included. The purpose of arrays of amplifiers 185 and 187 is to equalize the loss through the various optical paths so that the output spectrum of the recombined WDM stream has a similar optical power spectrum in each wavelength. This is done to ensure that the emerging WDD streams contain a similar optical power in each spectral line, which will contribute to longer reach for optical transmission. A plurality N of fibers 200 are coupled to the plurality N of input ports (I) of the fiber plane switch 182 at the ingress of the system 180, each fiber 200 coupled to a respective input port. Output ports (O) of fiber plane optical switch 182 are coupled to a plurality N of fibers, with each fiber 202 coupled to a respective output port. The fiber plane optical switch 182 also has a plurality N of expansion output ports (Eo) 204 coupled to a plurality N of 1:J demultiplexers. Each demultiplexer separates the DWDM signal, having M optical channels therein, into J groups of L optical channels or lambdas where J×L=M. For simplicity, FIG. 9 shows four (4) lambda groups plane optical switches, that is for illustrative purposes only, J=4. The expansion output ports of the lambda planes 186a–m are coupled to a wavelength converting switch 14 that is not part of the photonic switch core of system 180.

Figure 10:
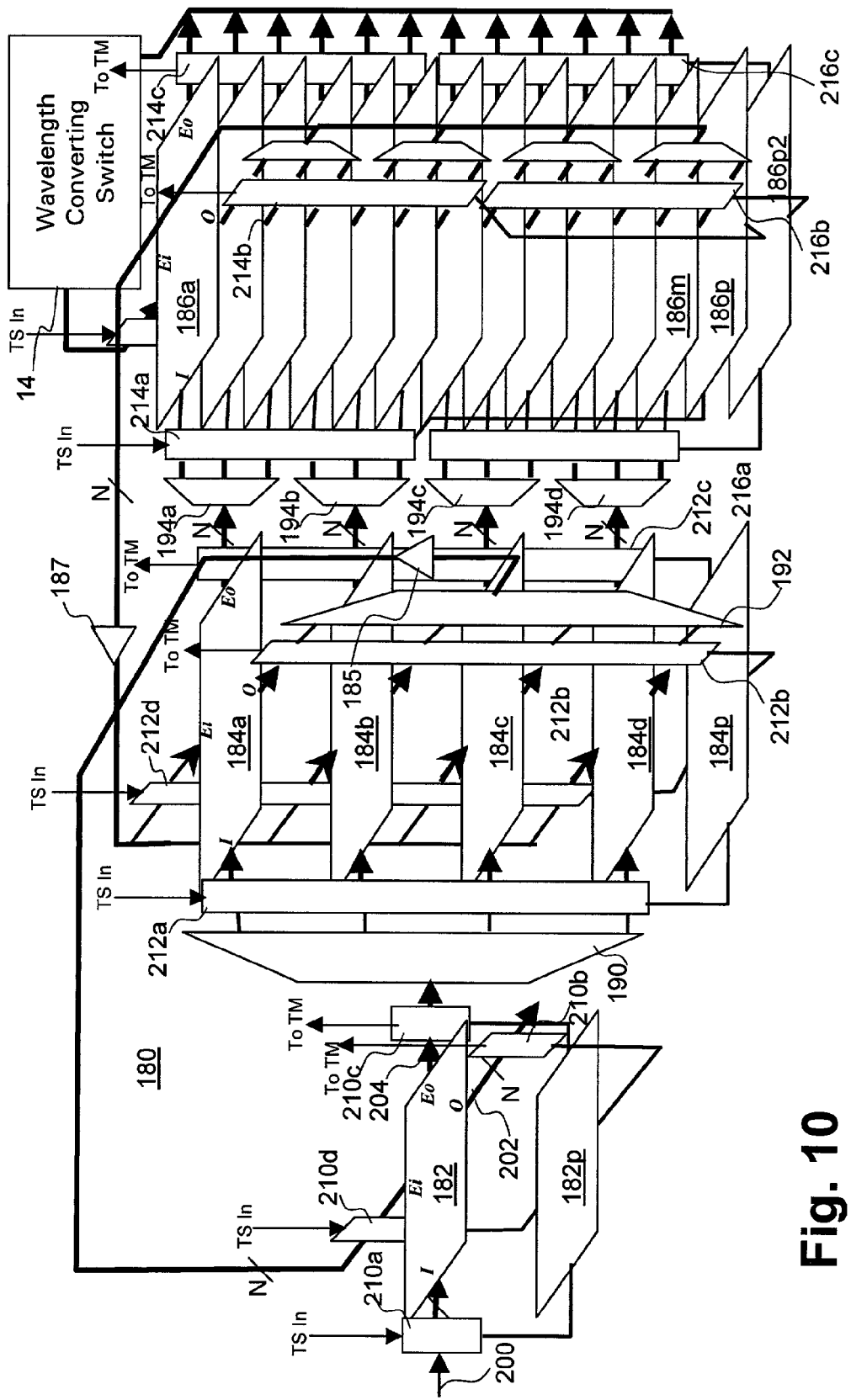
FIG. 10 illustrates in a functional block diagram a protection arrangement for the multiple granularity multiple plane optical switch core of FIG. 9 in accordance with an embodiment of the present invention.

Referring to FIG. 10 there is illustrated in a functional block diagram a protection arrangement for the multiple granularity multiple plane optical switch core of FIG. 9 in accordance with an embodiment of the present invention. The plane switches are implemented as four-port MEMS. Due to the complexity of the drawing, some of the reference characters common to FIGS. 9 and 10 have been dropped in FIG. 10 to make room for reference characters needed for additions to FIG. 10. FIG. 10 adds protection switches 210, 212, and 214 and 216 at the input and outputs of the fiber plane switch 182, the lambda group plane switches 184 and the lambda plane switches 186, respectively. The other additions include protection switch planes 182p, 184p and 186p and 186p2 for the fiber, lambda group and lambda layers, respectively. The protection switches used may be any of those previously described in connection with FIGS. 4, 5, or 7. The arrangement for FIG. 10 provides 1:1 protection for the fiber layer, J:1 protection for the lambda group layer and (M/2):1 protection for the lambda layer. Hence the multiple granularity switch core has the advantage of allowing the degree of protection provided to increase with increasing density of the optical signal.

Operationally, the protection arrangement of FIG. 10 is similar to that described for the lambda plane switch of FIGS. 3 and 8. The tapping of optical signals for the purposes of connectivity checking and power spectrum measurement would also include tapping of the intermediate optical amplifier arrays 185 and 187, between the lambda group and fiber planes and the lambda and lambda group planes, respectively. Note due to the complexity of FIGS. 9 and 10, the input and output optical amplifiers shown in FIG. 3 and 8 and any switch matrix associated EDWAs as shown in FIG. 8, are not shown in FIGS. 9 and 10.

Specifically, the fiber plane is protected by protection switches 210a, 210b, 210c and 210d at the inputs, outputs, expansion outputs and expansion inputs, respectively. For simplicity, each protection switch 210 is drawn as a single block, however there are N fiber inputs. Hence, all of the blocks 210a, 210b, 210c, and 210d represent N (y×1) optical switches, where y=1, 2, or 3, depending upon the embodiment of protection switch chosen (recall that y=2 or 3 allows the defective plane switch to be tested in situ during the protection switch condition.

Similarly, the lambda group planes are protected by protection switches 212a, 212b, 212c and 212d at the inputs, outputs, expansion outputs and expansion inputs, respectively. For simplicity, each protection switch 212 is drawn as a single block, however there are N demuxs 190 inputting to each lambda group plane 184a–d. Hence, all of the blocks 212a, 212b, 212c, and 212d represent N (y×J) optical switches, where y=1, 2, or 3, depending upon the embodiment of protection switch chosen.

Similarly, the lambda planes are protected by two sets of protection switches: protection switches 214a, 214b, 214c and 214d at the inputs, outputs, expansion outputs and expansion inputs of the top M/2 lambda planes, respectively and protection switches 216a, 216b, 216c and 216d at the inputs, outputs, expansion outputs and expansion inputs of the bottom M/2 lambda planes, respectively. For simplicity, each protection switch 214 and 216 is drawn as a single block, however there are N demuxs 194 inputting to each lambda plane 186a–m. Hence, all of the blocks 214a, 214b, 214c, 214d, 216a, 216b, 216c and 216d, represent N (y×M/2) optical switches, where y=1, 2, or 3, depending upon the embodiment of protection switch chosen.

Figure 11:
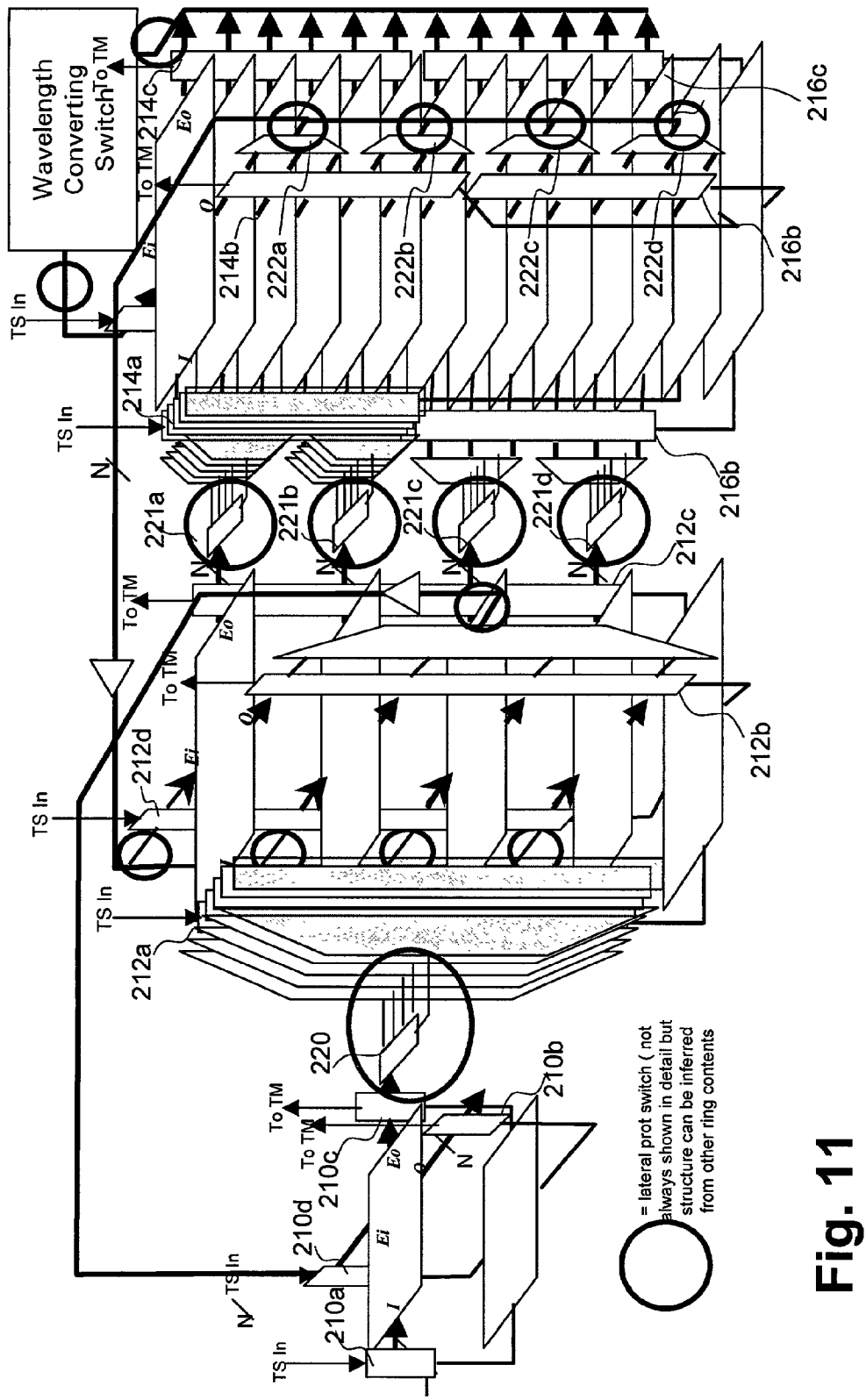
FIG. 11 illustrates in a functional block diagram a protection arrangement for the switch core and ports of FIG. 9 in accordance with an embodiment of the present invention.

Referring to FIG. 11 there is illustrated in a functional block diagram a protection arrangement for the switch core and ports of FIG. 9 in accordance with an embodiment of the present invention. Due to the complexity of the drawing, some of the reference characters common to FIGS. 9 and 10 have been dropped in FIG. 11 to make room for reference characters needed for additions to FIG. 11. The port protection arrangement of FIG. 11 provides 1:N sparing for each port at the lambda group and lambda layer. Specifically, FIG.

11 adds protection switches 220 and 221 between outputs of the fiber plane switch protection switches 210c and the lambda group demuxs 190, and between the lambda group plane protection switches 212c and the lambda demuxs 194, respectively. The other additions include at the lambda group level: sparing of demuxs 190 and protection switches 212a–d, and muxs 192, plus addition of a row and column of mirrors on each of the switch planes 184a–d and, a spare switch plane184p. Similarly, The other additions include at the lambda level: sparing of demuxs 194a–d and protection switches 214a–d, 216a–d and muxs 196a–d, plus an addition of a row and column of mirrors on each of the switch planes 186a–m and, a spare switch planes 186p and 186p2.

In order to keep the drawing from becoming too complicated, only the protection switch 220, demuxs 190, protection switches 212a, protection switches 221a–d, demuxs 194a–b and protection switches 214a are shown in expanded form. However it is to be understood that similar sparing is required at the remaining inputs and outputs of the lambda group and lambda plane switches as indicated partially by circles on FIG. 11, for example protection switches 222a–d,.

The protection switches used may be any of those previously described in connection with FIGS. 4, 5, or 7.

Operationally, the protection arrangement of FIG. 11 is similar to that described for the lambda plane switch of FIGS. 3 and 8. The tapping of optical signals for the purposes of connectivity checking and power spectrum measurement would also include tapping of the intermediate optical amplifier arrays 185 and 187, between the lambda group and fiber planes and the lambda and lambda group planes, respectively. Note due to the complexity of FIG. 11, the input and output optical amplifiers shown in FIG. 3 and 8 are not shown in FIG. 11.

Figure 12:
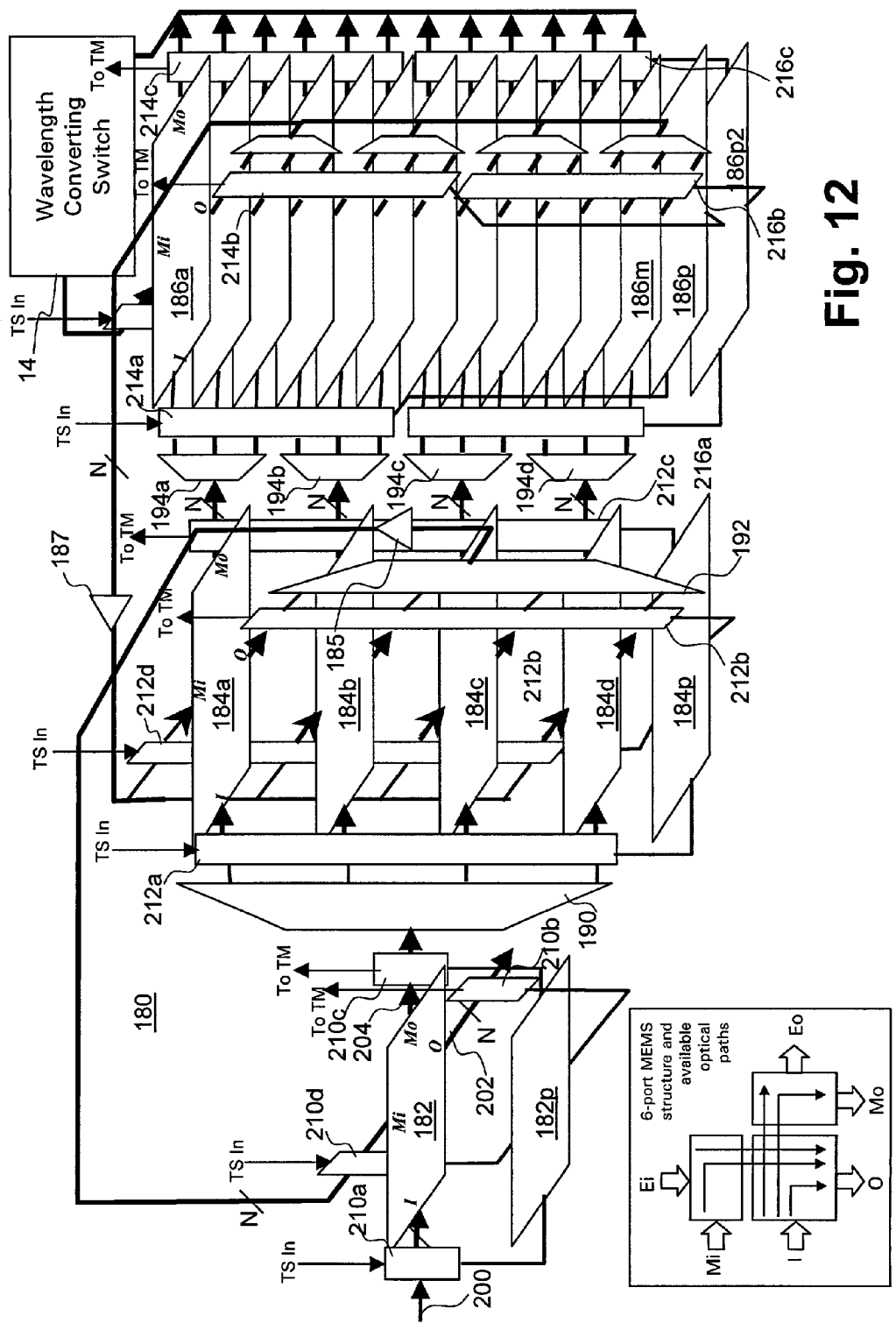
FIG. 12 illustrates in a functional block a protection arrangement for the multiple granularity multiple plane optical switch core of FIG. 9 with the plane switches implemented as six-port MEMS in accordance with an embodiment of the present invention.

Referring to FIG. 12 there is illustrated in a functional block diagram a protection arrangement for the multiple granularity multiple plane optical switch core of FIG. 9 with the plane switches implemented as six-port MEMS in accordance with an embodiment of the present invention. Due to the complexity of the drawing, some of the reference characters common to FIGS. 9 and 10 have been dropped in FIG. 12 to make room for reference characters needed for additions to FIG. 12.

The plane switches are implemented as six-port MEMS. A representation of a six-port MEMS is shown in the lower left hand corner of FIG. 12. Unlike the four port MEMS used in FIGS. 9–11, where the ports used to return signals to a switch plane are the expansion ports, in which the number of ports on the input ports Ei and output ports Eo are equal to those of the primary inputs I and outputs O and exhibit a fixed mapping between I, Eo and Ei, O. A six-port MEMS provides matrix inputs and outputs Mi and Mo, that have a fewer number of ports, and a suitable mapping between I, Mo and Mi, O, while the mapping between I, Eo and Ei, O remain fixed. The use of 6-port MEMS allows a layered switch core that tapers, in umber of ports from the fiber layer to the lambda group layer to the lambda layer. FIG. 12 adds protection switches 210, 212, and 214 and 216 at the input and outputs of the fiber plane switch 182, the lambda group plane switches 184 and the lambda plane switches 186, respectively. The other additions include protection switch planes 182p, 184p and 186p and 186p2 for the fiber, lambda group and lambda layers, respectively. The protection switches used may be any of those previously described in connection with FIGS. 4, 5, or 7. The arrangement for FIG. 12 provides 1:1 protection for the fiber layer, J:1 protection for the lambda group layer and (M/Q):1 protection for the lambda layer, where Q is the number of switches per tributary (e.g. Q=2 for the present example). This is done: to control differential loss that would be incurred in a longer protection switch; to allow a lower protection ratio than M:1; and to allow the switch to be physically partitioned. Hence the multiple granularity switch core has the advantage of allowing the degree of protection provided to increase with increasing density of the optical signal. The core protection is that same as that shown in FIG. 10 for the four-port MEMS implementation. The difference that becomes apparent is in considering protection at the port level. While the four-port MEMS implementation of FIG. 11 required additional protection switches 221 and 222, the six-port MEMS version eliminates these protection switches by providing the additional paths within the switch planes by increasing the number of Mi and Mo ports. Hence the protection arrangement of FIG. 12, is the functional equivalent of that provided by FIG. 11.

Figure 13:
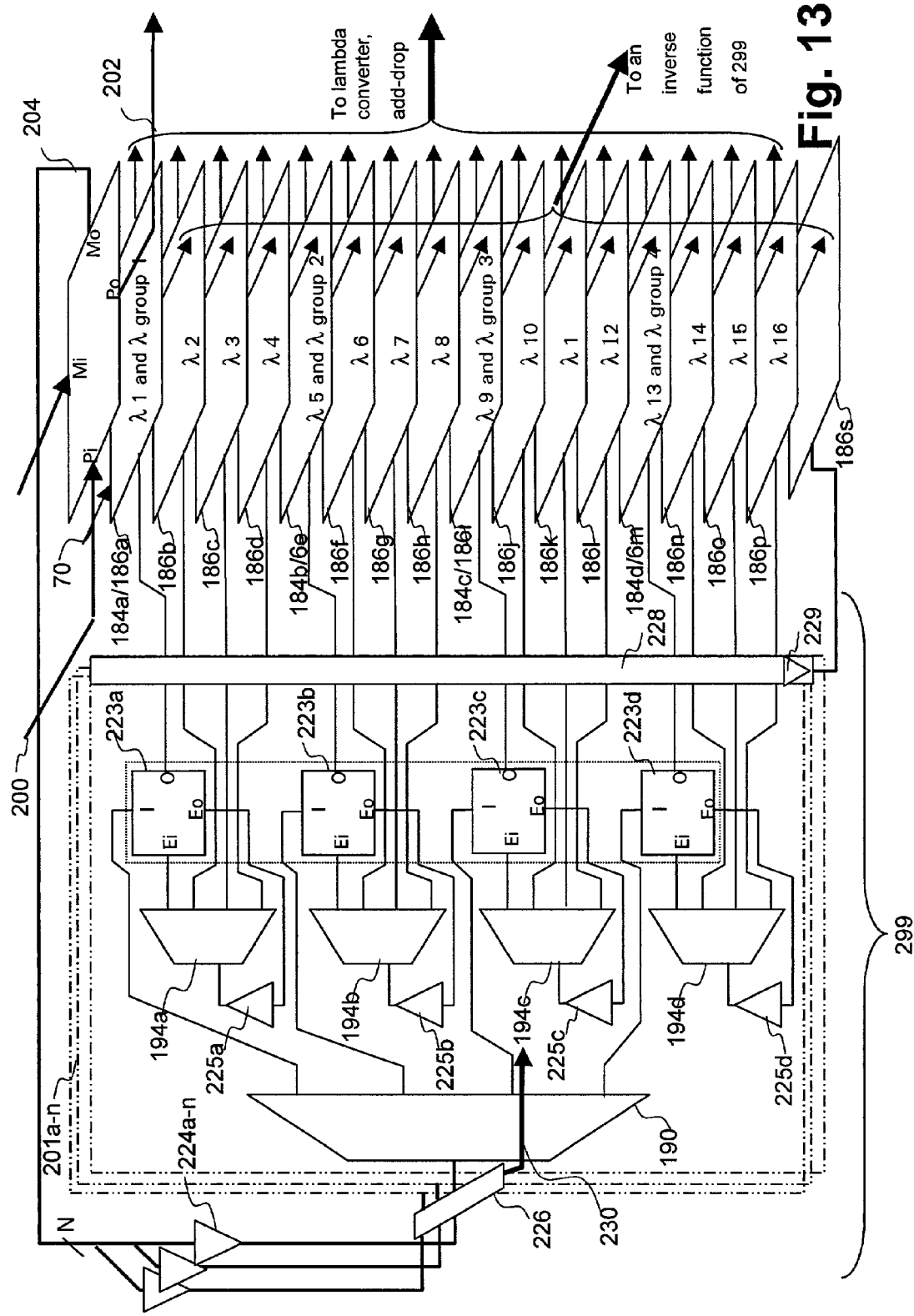
FIG. 13 illustrates in a functional block diagram a protection arrangement for the switch core and ports of a combined switch core in accordance with an embodiment of the present invention.

Referring to FIG. 13 there is illustrated in a functional block diagram a protection arrangement for the switch core and ports of a combined switch core in accordance with an embodiment of the present invention. For convenience the same reference characters used in earlier figures have been used in FIG. 13 for similar elements. In FIG. 13, a logically layered switch is embodied, that maps a lambda and a lambda group onto a single physical plane, for example 184a/186a, 184b/186e, 184c/186I and 184d/186m. This is accomplished in a tributary cards (TRIB) 201a–n. The TRIB card 201a includes the lambda group demux 190 and lambda demuxs 194a–d as shown in previous drawings. However the TRIB card 200a also includes 1×1 four port MEMS switches 223a–d. The placement of these switches allows lambda plane switching (for that group) when not activated and lambda group switching when activated. For example, when 2×2 MEMS switch 223a is not activated lambda group 1 passes straight through from the input I to the output Eo to demux 24a, whose first output in input to Ei for straight through output to output O and on to lambda plane switch 16a. If lambda group 1 is to be switched, 1×1 four port MEMS switch 223a is activated and the lambda group at input I is switched to output O and onto lambda group plane 184a. However in this configuration lambda plane switch 186a and lambda group plane switch 184a are the same plane switch. Consequently the TRIB card 201a couples either a lambda to each plane in a lambda group or the lambda group to the first lambda plane in the lambda group. Note this is a per tributary card function, hence λ1s or λgroup 1s from other TRIB cards 201b–n could be input to the switch plane 184a/186a and hence co-exist thereon as long as the provisioning of the tributary cards at the individual λ, λ-group level and the permissible cross-connect mapping between tributaries through the affected switch cores is consistent. This is achieved by linking the tributary card mapping status and the cross-connect map in the control processor, so that cross-connects are only permitted between tributary cards that are like-provisioned in respect to λ, λ-groups. Also shown is an array of EDWA (Erbium Doped Waveguide Amplifiers) 224 and 225a–d similar to those discussed with regard to FIG. 8. The EDWA 224 compensates for the increased loss of the lambda-group switching path relative to the fiber path. The EDWAs 225a–d compensate for the losses of the per lambda paths (the loss in 194a–d and the inverse function on the other side of the switch (not shown in FIG. 13 for simplicity) relative to the respective lambda group. Each protection switch 228 includes an EDWA 229 to compensate for losses in the protection path.

The port protection arrangement of FIG. 13 provides 1:N sparing for each port at the fiber layer by providing a spare trib card (not shown) for trib cards 201*a–n* and switch plane protection by providing a spare switch plane 186*s*. Specifically, FIG. 13 adds protection switches 226 and 228 between outputs of the fiber plane switch switch and the demuxs 190/194, respectively. The spare trib card is not shown due to the complexity of FIG. 13, but would be similar in configuration to the trib cards 201*a–n* and the protection channel to the spare TRIB card is indicated by an arrow 230.

Operationally, the protection arrangement of FIG. 13 is similar to that described for the multiple granularity switch of FIGS. 10 and 11. The tapping of optical signals for the purposes of connectivity checking and power spectrum measurement would also include tapping of the intermediate optical amplifier arrays 224 and 225. Note due to the complexity of FIG. 12, the input and output optical amplifiers shown in FIG. 3 and 8 are not shown.

Figure 14:
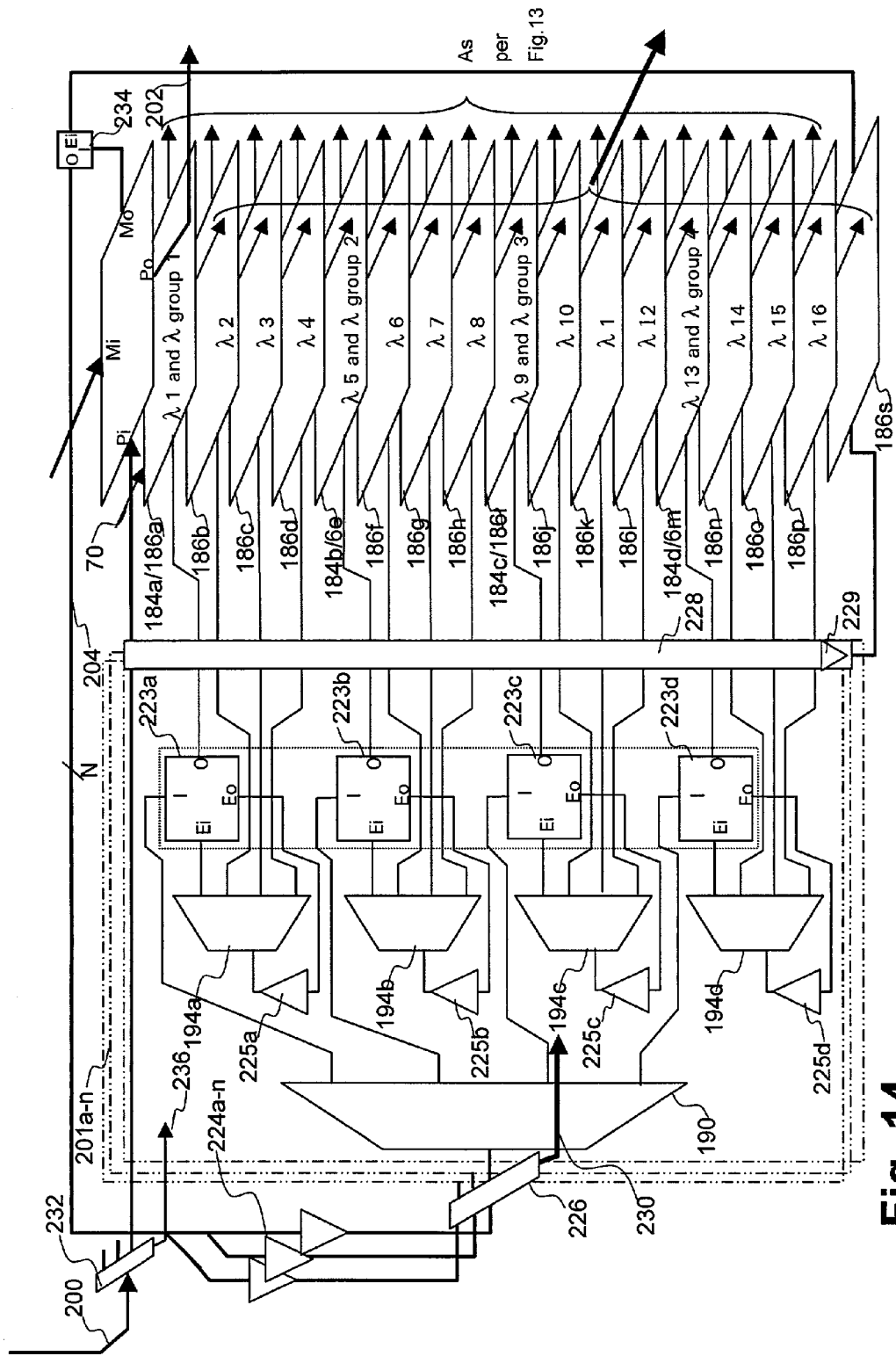
FIG. 14 illustrates the optical switch of FIG. 13 modified to provide fiber plane switch protection using the same protection switch plane as used for lambda and lambda group protection in FIG. 13.

Referring to FIG. 14 there is illustrated the optical switch of FIG. 13 modified to provide fiber plane switch protection using the same protection switch plane as used for lambda and lambda group protection in FIG. 13. Specifically, FIG. 14 adds a protection switch 232 at the fiber inputs to the tributary cards, an additional mirror on protection switch 228 and a 2×2 MEMS switch 234 (similar to those on the tributary cards).

In operation, the protection switch 232 at the fiber inputs provides N:1 protection port protection for the fiber ports by protection switching the spare tributary card as indicated by an arrow 236. The fiber plane switch 182 is protected by activation the additional mirror at the top of the protection switch 229 and by activation of the 2×2 MEMS 234. In the event of a failure in the fiber plane switch 182, the fiber input is diverted down the protection switch 228 (in the manner illustrated with regard to FIGS. 4, 5 and 7), amplified by EDWA 229 and coupled to spare switch plane 186*s*, Mo outputs are couple back through the 2×2 MEMS switch 234 to tributary card inputs 224*a–n*.

Throughout this above description the terms multiplexers and demultiplexers have been used, however one of ordinary skill would recognize that between one layer and another layer, interleavers and de-interleavers could alternatively be used. For simplicity, all drawings show unidirectional paths through the plane switches, however as would be appreciated by one of ordinary skill, the optical plane switches can carry bi-directional traffic with suitable input and output components.

Modifications, variations and adaptations to the embodiments of the invention described above are possible within the scope of the invention, which is defined by the claims.

What is claimed is:

1. A protection switching arrangement for optical switching systems, comprising:
   a plurality of optical switching matrices, each one the optical switching matrices having a plurality of inputs and a plurality of outputs and being operative to switch optical channel signals from any one of the inputs to any one of the outputs;
   a plurality of wavelength division demultiplexers, each one of the wavelength division demultiplexers having a plurality of outputs each coupled to one of the inputs of a respective one of the optical switching matrices, each one of the wavelength division demultiplexers having an input and being operative for dividing a composite optical signal at its input into optical channel signals and providing each optical channel signal to a respective one of the optical switching matrices;
   a spare wavelength division demultiplexer having a plurality of outputs each coupled to one of the inputs of a respective one of the optical switching matrices, the spare wavelength division demultiplexer having an input and being operative for dividing a composite optical signal at its input into optical channel signals and providing each optical channel signal to a respective one of the optical switching matrices; and
   a first optical protection switch having a plurality of inputs, a plurality of straight-through outputs, and a protection output, the first optical protection switch being coupled at each of its straight-through outputs to the input of a respective one of the wavelength division demultiplexers and coupled at its protection output to the input of the spare wavelength division demultiplexer;
   a plurality of second optical protection switches, each one of the second optical protection switches having a plurality of outputs each coupled to one of the inputs of a respective one of the optical switching matrices and a plurality of inputs coupled to the outputs of a respective one of the wavelength division demultiplexers;
   a spare optical switching matrix having a plurality of inputs and a plurality of outputs and being operative to switch optical channel signals from any one of its inputs to any one of its outputs, each one of the second optical protection switches having a spare output coupled to one of the inputs of the spare optical switching matrix, wherein each one of the second optical protection switches is operative to couple one of its inputs associated with a faulty one of the optical switching matrices to its spare output to enable the spare optical switching matrix to serve as a backup for the faulty one of the optical switching matrices.

2. A protection switching arrangement as claimed in claim 1, wherein the optical channel signals are lambdas.

3. A protection switching arrangement as claimed in claim 1, wherein the first optical protection switch is operative to couple one of its inputs associated with a faulty one of the wavelength division demultiplexers to its protection output to enable the spare wavelength division demultiplexer to serve as a backup for the faulty one of the wavelength division demultiplexers.

4. A protection switching arrangement for optical switching systems, comprising:
   a plurality of optical switching matrices, each one the optical switching matrices having a plurality of inputs and a plurality of outputs and being operative to switch optical channel signals from any one of the inputs to any one of the outputs;
   a plurality of wavelength division demultiplexers, each one of the wavelength division demultiplexers having a plurality of outputs each coupled to one of the inputs of a respective one of the optical switching matrices, each one of the wavelength division demultiplexers having an input and being operative for dividing a composite optical signal at its input into optical channel signals and providing each optical channel signal to a respective one of the optical switching matrices;
   a spare wavelength division demultiplexer having a plurality of outputs each coupled to one of the inputs of a respective one of the optical switching matrices, the spare wavelength division demultiplexer having an input and being operative for dividing a composite optical signal at its input into optical channel signals and providing each optical channel signal to a respective one of the optical switching matrices; and a first optical protection switch having a plurality of inputs, a plurality of straight-through outputs, and a protection output, the first optical protection switch being coupled at each of its straight-through outputs to the input of a respective one of the wavelength division demultiplexers and coupled at its protection output to the input of the spare wavelength division demultiplexer;

a plurality of second optical protection switches, each one of the second optical protection switches having a plurality of outputs each coupled to one of the inputs of a respective one of the optical switching matrices and a plurality of inputs coupled to the outputs of a respective one of the wavelength division demultiplexers;

a plurality of third optical protection switches and a plurality of wavelength division multiplexers, each one of the wavelength division multiplexers having a plurality of inputs, each one of the third optical protection switches having a plurality of inputs each coupled to one of the outputs of a respective one of the optical switching matrices and a plurality of outputs coupled to the inputs of a respective one of the wavelength division multiplexers.

5. A protection switching arrangement as claimed in claim 4, wherein the optical channel signals are lambdas.

6. A protection switching arrangement as claimed in claim 4, wherein the first optical protection switch is operative to couple one of its inputs associated with a faulty one of the wavelength division demultiplexers to its protection output to enable the spare wavelength division demultiplexer to serve as a backup for the faulty one of the wavelength division demultiplexers.

7. A protection switching arrangement for optical switching systems, comprising:
    a plurality of optical switching matrices, each one the optical switching matrices having a plurality of inputs and a plurality of outputs and being operative to switch optical channel signals from any one of the inputs to any one of the outputs, wherein, for each one of the optical switching matrices, the plurality of inputs is a plurality of first inputs and the plurality of outputs is a plurality of first outputs, each one of the optical switching matrices having a second input and a second output;
    a wavelength converting switch having:
        a plurality of outputs each coupled to the second input of a respective one of the optical switching matrices; and
        a plurality of inputs each coupled to the second output of a respective one of the optical switching matrices;
    a plurality of wavelength division demultiplexers, each one of the wavelength division demultiplexers having a plurality of outputs each coupled to one of the inputs of a respective one of the optical switching matrices, each one of the wavelength division demultiplexers having an input and being operative for dividing a composite optical signal at its input into optical channel signals and providing each optical channel signal to a respective one of the optical switching matrices;
    a spare wavelength division demultiplexer having a plurality of outputs each coupled to one of the inputs of a respective one of the optical switching matrices, the spare wavelength division demultiplexer having an input and being operative for dividing a composite optical signal at its input into optical channel signals and providing each optical channel signal to a respective one of the optical switching matrices; and an optical protection switch having a plurality of inputs, a plurality of straight-through outputs, and a protection output, the optical protection switch being coupled at each of its straight-through outputs to the input of a respective one of the wavelength division demultiplexers and coupled at its protection output to the input of the spare wavelength division demultiplexer.

8. A protection switching arrangement as claimed in claim 7, wherein the optical protection switch is a first optical protection switch, said protection switching arrangement further comprising a plurality of second optical protection switches, each one of the second optical protection switches having a plurality of outputs each coupled to one of the inputs of a respective one of the optical switching matrices and a plurality of inputs coupled to the outputs of a respective one of the wavelength division demultiplexers.

9. A protection switching arrangement as claimed in claim 7, further comprising a spare optical switching matrix having a plurality of inputs and a plurality of outputs and being operative to switch optical channel signals from any one of its inputs to any one of its outputs, each one of the second optical protection switches having a spare output coupled to one of the inputs of the spare optical switching matrix.

10. A protection switching arrangement as claimed in claim 7, wherein the optical channel signals are lambdas.

11. A protection switching arrangement as claimed in claim 7, wherein the optical protection switch is operative to couple one of its inputs associated with a faulty one of the wavelength division demultiplexers to its protection output to enable the spare wavelength division demultiplexer to serve as a backup for the faulty one of the wavelength division demultiplexers.

12. A protection switching arrangement for optical switching systems, comprising:
    a plurality of optical switching matrices, each one the optical switching matrices having a plurality of inputs and a plurality of outputs and being operative to switch optical channel signals from any one of the inputs to any one of the outputs, wherein for each one of the optical switching matrices, the plurality of inputs is a plurality of first inputs and the plurality of outputs is a plurality of first outputs, each one of the optical switching matrices having a second input and a second output;
    a wavelength converting switch having:
        a plurality of outputs each coupled to the second input of a respective one of the optical switching matrices; and
        a plurality of inputs each coupled to the second output of a respective one of the optical switching matrices;
    a plurality of wavelength division demultiplexers, each one of the wavelength division demultiplexers having a plurality of outputs each coupled to one of the inputs of a respective one of the optical switching matrices, each one of the wavelength division demultiplexers having an input and being operative for dividing a composite optical signal at its input into optical channel signals and providing each optical channel signal to a respective one of the optical switching matrices;
    a spare wavelength division demultiplexer having a plurality of outputs each coupled to one of the inputs of a respective one of the optical switching matrices, the spare wavelength division demultiplexer having an input and being operative for dividing a composite optical signal at its input into optical channel signals and providing each optical channel signal to a respective one of the optical switching matrices; and a first optical protection switch having a plurality of inputs, a plurality of straight-through outputs, and a protection output, the first optical protection switch being coupled at each of its straight-through outputs to the input of a respective one of the wavelength division demultiplexers and coupled at its protection output to the input of the spare wavelength division demultiplexer;

a plurality of second optical protection switches, each one of the second optical protection switches having a plurality of outputs each coupled to one of the inputs of a respective one of the optical switching matrices and a plurality of inputs coupled to the outputs of a respective one of the wavelength division demultiplexers.

13. A protection switching arrangement as claimed in claim 12, wherein the optical channel signals are lambdas.

14. A protection switching arrangement as claimed in claim 12, wherein the first optical protection switch is operative to couple one of its inputs associated with a faulty one of the wavelength division demultiplexers to its protection output to enable the spare wavelength division demultiplexer to serve as a backup for the faulty one of the wavelength division demultiplexers.

15. A protection switching arrangement as claimed in claim 12, further comprising a spare optical switching matrix having a plurality of inputs and a plurality of outputs and being operative to switch optical channel signals from any one of its inputs to any one of its outputs, each one of the second optical protection switches having a spare output coupled to one of the inputs of the spare optical switching matrix.

16. A protection switching arrangement for optical switching systems, comprising:

a plurality of optical switching matrices, each one the optical switching matrices having a plurality of inputs and a plurality of outputs and being operative to switch optical channel signals from any one of the inputs to any one of the outputs, for each one of the optical switching matrices, the plurality of inputs is a plurality of first inputs and the plurality of outputs is a plurality of first outputs, each one of the optical switching matrices having a second input and a second output;

a wavelength converting switch having:
  a plurality of outputs each coupled to the second input of a respective one of the optical switching matrices; and
  a plurality of inputs each coupled to the second output of a respective one of the optical switching matrices;

a plurality of wavelength division demultiplexers, each one of the wavelength division demultiplexers having a plurality of outputs each coupled to one of the inputs of a respective one of the optical switching matrices, each one of the wavelength division demultiplexers having an input and being operative for dividing a composite optical signal at its input into optical channel signals and providing each optical channel signal to a respective one of the optical switching matrices;

a spare wavelength division demultiplexer having a plurality of outputs each coupled to one of the inputs of a respective one of the optical switching matrices, the spare wavelength division demultiplexer having an input and being operative for dividing a composite optical signal at its input into optical channel signals and providing each optical channel signal to a respective one of the optical switching matrices; and a first optical protection switch having a plurality of inputs, a plurality of straight-through outputs, and a protection output, the first optical protection switch being coupled at each of its straight-through outputs to the input of a respective one of the wavelength division demultiplexers and coupled at its protection output to the input of the spare wavelength division demultiplexer;

a plurality of second optical protection switches, each one of the second optical protection switches having a plurality of outputs each coupled to one of the inputs of a respective one of the optical switching matrices and a plurality of inputs coupled to the outputs of a respective one of the wavelength division demultiplexers;

a spare optical switching matrix having a plurality of inputs and a plurality of outputs and being operative to switch optical channel signals from any one of its inputs to any one of its outputs, each one of the second optical protection switches having a spare output coupled to one of the inputs of the spare optical switching matrix.

17. A protection switching arrangement as claimed in claim 16, wherein the optical channel signals are lambdas.

18. A protection switching arrangement as claimed in claim 16, wherein the first optical protection switch is operative to couple one of its inputs associated with a faulty one of the wavelength division demultiplexers to its protection output to enable the spare wavelength division demultiplexer to serve as a backup for the faulty one of the wavelength division demultiplexers.

* * * * *